US012651900B2

(12) United States Patent
    Chavan et al.

(10) Patent No.: US 12,651,900 B2
(45) Date of Patent: Jun. 9, 2026

(54) METHOD FOR FAULT CURRENT LIMITING BETWEEN SOLID-STATE CIRCUIT BREAKERS

(71) Applicant: ABB Schweiz AG, Baden (CH)

(72) Inventors: Govind S. Chavan, Garner, NC (US);
               Zhou Dong, Raleigh, NC (US);
               Chunmeng Xu, Raleigh, NC (US);
               Pietro Cairoli, Cary, NC (US);
               Abhinav Patni, Raleigh, NC (US)

(*) Notice: Subject to any disclaimer, the term of this patent is extended or adjusted under 35 U.S.C. 154(b) by 171 days.

(21) Appl. No.: 18/612,093

(22) Filed: Mar. 21, 2024

(65) Prior Publication Data

US 2025/0300451 A1      Sep. 25, 2025

(51) Int. Cl.
    *H02H 9/02*      (2006.01)
(52) U.S. Cl.
    CPC ..................................... *H02H 9/02* (2013.01)
(58) Field of Classification Search
    CPC .. H02H 9/02; H02H 3/20; H02H 9/04; H02H 3/05; H02H 1/00; H02H 3/08; H02H 1/0007; H02H 3/093; H02H 7/26; H02H 9/002; H02H 9/001; H02H 7/30; H02H 9/025
    USPC ...................................................... 361/2–13
    See application file for complete search history.

(56) References Cited

U.S. PATENT DOCUMENTS

| 11,037,749 B2 | 6/2021 | Kouroussis et al. |
| 11,283,258 B2 | 3/2022 | Zhou et al. |
| 11,394,199 B2 | 7/2022 | Qi et al. |
| 11,539,202 B1 | 12/2022 | Contrael et al. |
| 2022/0085600 A1* | 3/2022 | Qi .............................. H02H 3/08 |
| 2022/0399712 A1* | 12/2022 | Contrael ................. G06F 30/20 |

FOREIGN PATENT DOCUMENTS

| CN | 113162000 B | 2/2023 |
| EP | 3694068 B1 | 10/2023 |
| GB | 2375902 A | 11/2002 |

OTHER PUBLICATIONS

Chavan et al., "Coordination of Solid-State Circuit Breakers for DC Grids Under High-Fault-di/dt Conditions," *2022 IEEE Energy Conversion Congress and Exposition (ECCE)*, 5 pp. (Oct. 9-13, 2022).
Solangi et al., "Selective Coordination of GaN-Based Solid State Circuit Breakers," *IEEE Applied Power Electronics Conference and Exposition (APEC)*, pp. 1140-1145 (Jun. 14, 2021).
European Patent Office, Extended European Search Report in European Patent Application No. 25162419.3, 11 pp. (Jul. 1, 2025).

* cited by examiner

*Primary Examiner* — Danny Nguyen
(74) *Attorney, Agent, or Firm* — Fitch Even Tabin & Flannery LLP

(57) ABSTRACT

A circuit breaker network includes a solid-state circuit breaker (SSCB), one or more circuit breakers, and a current limiting control circuit of the SSCB. The current limiting control circuit is programmed to determine a first time period for keeping the SSCB in an on state, determine a second time period for keeping the SSCB in an off state, and switch, cyclically, the SSCB to the off state for the second time period and then to the on state for the first time period to control the fault current within a predetermined band-to-band range that is below the first current threshold and above the second current threshold for a fault clearance duration.

20 Claims, 7 Drawing Sheets

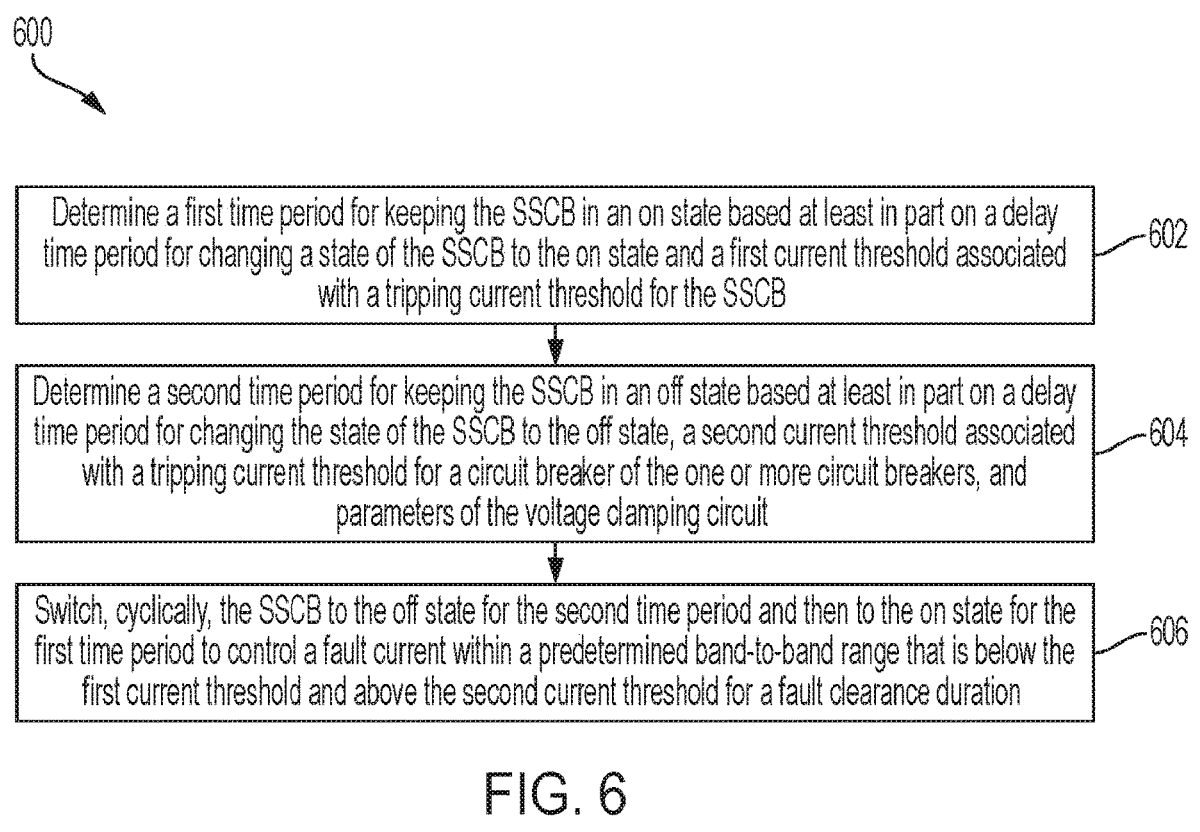

600

Determine a first time period for keeping the SSCB in an on state based at least in part on a delay time period for changing a state of the SSCB to the on state and a first current threshold associated with a tripping current threshold for the SSCB — 602

Determine a second time period for keeping the SSCB in an off state based at least in part on a delay time period for changing the state of the SSCB to the off state, a second current threshold associated with a tripping current threshold for a circuit breaker of the one or more circuit breakers, and parameters of the voltage clamping circuit — 604

Switch, cyclically, the SSCB to the off state for the second time period and then to the on state for the first time period to control a fault current within a predetermined band-to-band range that is below the first current threshold and above the second current threshold for a fault clearance duration — 606

FIG. 6

METHOD FOR FAULT CURRENT LIMITING BETWEEN SOLID-STATE CIRCUIT BREAKERS

FIELD

The present disclosure relates to systems and methods for fault current limiting between solid-state circuit breakers and other breakers of a network.

BACKGROUND

The present disclosure is directed, generally, to controlling circuit breakers, such as solid-state circuit breakers (SSCBs), during a fault in a network. Circuit breakers are designed to safeguard connected electrical devices against current overloads and short circuits which can occur during a fault. Circuit breakers can detect when a fault is occurring, or an unacceptably high overload is occurring and break its circuit to prevent high levels of current from harming other components in the network. However, conventional circuit breakers can react slowly once a fault has been detected resulting in tripping multiple circuit breakers in a network even though other circuit breakers may not be near the location of the fault. Even in systems which utilize both a solid-state circuit breaker and more conventional circuit breakers to try and bypass this problem still can't fully resolve the issue. Depending on the architecture used a faster solid-state circuit breaker may still trip resulting in a loss of current to multiple downstream circuit breakers of a network. This problem is further complicated in direct current (DC) power networks as short circuit currents in DC systems behave differently than short circuit events in alternating current (AC) systems.

SUMMARY

An embodiment of the present disclosure provides a circuit breaker network for executing fault current limiting control, including a solid-state circuit breaker (SSCB) disposed as a main or upstream circuit breaker, and one or more circuit breakers disposed as branch or downstream circuit breakers. The SSCB includes a current limiting control circuit, a semiconductor switch, and a voltage clamping circuit. The current limiting control circuit includes a processor, a memory, and computer-readable logic code stored in the memory, that when executed by the processor, causes the current limiting control circuit to: determine a first time period for keeping the SSCB in an on state based at least in part on a delay time period for changing a state of the SSCB to the on state and a first current threshold associated with a tripping current threshold for the SSCB; determine a second time period for keeping the SSCB in an off state based at least in part on a delay time period for changing the state of the SSCB to the off state, a second current threshold associated with a tripping current threshold for a circuit breaker of the one or more circuit breakers, and parameters of the voltage clamping circuit; and switch, cyclically, the SSCB to the off state for the second time period and then to the on state for the first time period to control a fault current within a predetermined band-to-band range that is below the first current threshold and above the second current threshold for a fault clearance duration.

In an embodiment, the circuit breaker is another SSCB or an electromechanical circuit breaker.

In an embodiment, the SSCB further comprises a gate driver circuit configured to switch the SSCB between the on state and the off state.

In an embodiment, the delay time period for changing a state of the SSCB to the on state and the delay time period for changing the state of the SSCB to the off state are based at least in part on a speed of opening and closing associated with the gate driver circuit.

In an embodiment, the SSCB is arranged in a hierarchical manner such that the main or upstream circuit breaker feeds the current to the branch or downstream circuit breaker, wherein the branch or downstream circuit breaker feeds the current to either end loads or to further smaller branch circuit breakers, wherein when a fault occurs only a closest circuit breaker of the one or more circuit breakers upstream of the fault will trip thereby enabling a load to continue to be provided to other circuit breakers of the one or more circuit breakers of the circuit breaker network.

In an embodiment, the fault clearance duration corresponds to a certain time period required for the circuit breaker to clear a fault associated with the fault current.

In an embodiment, the current limiting control circuit is further configured to switch the SSCB to the off state upon expiration of the fault clearance duration.

In an embodiment, the current limiting control circuit is further configured to switch the SSCB to the on state in response to the circuit breaker clearing the fault.

In an embodiment, determining the first time period, the second time period, and switching the SSCB is based on a user preference setting indicating the fault current limiting control for the SSCB.

In an embodiment, a rate of rise for the fault current of a fault occurring in the circuit breaker network is based on a fault inductance between a source for the circuit breaker network and a fault location of the fault in the circuit breaker network.

In an embodiment, switching the SSCB to the on state for the first time period allows the fault current for a fault to peak at a certain current value that falls in a first band.

In an embodiment, switching the SSCB to the off state for the second time period allows the fault current for the fault to fall to another current value that falls in a second band.

In an embodiment, the first band is less than the tripping current threshold for the SSCB, and wherein the second band is greater than the tripping current threshold for the circuit breaker.

In an embodiment, the circuit breaker network further includes a direct current (DC) capacitor as a downstream load, and wherein the current limiting control circuit is further configured to switch, cyclically, the SSCB between the off state and the on state to charge the DC capacitor.

In an embodiment, a rate of rise of the current for charging the DC capacitor changes as the DC capacitor voltage increases.

Another embodiment of the present disclosure provides a method of providing fault current limiting control in a circuit breaker network including: providing a solid-state circuit breaker (SSCB) disposed as main or upstream circuit breaker, the SSCB including a current limiting control circuit, a semiconductor switch, and a voltage clamping circuit; and a circuit breaker disposed as a branch of downstream breaker. The current limiting control circuit is configured to: determine a rate of rise for a fault current of a fault occurring in the circuit breaker network; determine a first time period for keeping the SSCB in an on state based at least in part on the rate of rise for the fault current, a delay time period for changing a state of the SSCB to the on state, and a first current threshold associated with a tripping current threshold for the SSCB; determine a second time period for keeping the SSCB in an off state based at least in part on a rate of fall for the fault current, a delay time period for changing the state of the SSCB to the off state, a second current threshold associated with a tripping current threshold for the circuit breaker, and parameters of the voltage clamping circuit; and switch, cyclically, the SSCB to the off state for the second time period and then to the on state for the first time period to control the fault current within a predetermined band-to-band range that is below the first current threshold and above the second current threshold for a fault clearance duration.

Another embodiment of the present disclosure provides a current limiting control circuit of a solid-state circuit breaker (SSCB) for providing fault current limiting control in a circuit breaker network, the current limiting control circuit including processing circuitry configured to: determine a rate of rise for a fault current of a fault occurring in the circuit breaker network; determine a first time period for keeping the SSCB in an on state based at least in part on the rate of rise for the fault current, a delay time period for changing a state of the SSCB to the on state, and a first current threshold associated with a tripping current threshold for the SSCB; determine a second time period for keeping the SSCB in an off state based at least in part on a rate of fall for the fault current, a delay time period for changing the state of the SSCB to the off state, and a second current threshold associated with a tripping current threshold for a circuit breaker of the circuit breaker network; and switch, cyclically, the SSCB to the off state for the second time period and then to the on state for the first time period to control the fault current within a predetermined band-to-band range that is below the first current threshold and above the second current threshold for a fault clearance duration.

In an embodiment, the SSCB is disposed as a main or upstream circuit breaker, the circuit breaker is disposed as a branch or downstream circuit breaker, and wherein the SSCB is arranged in a hierarchical manner such that the main or upstream circuit breaker feeds the current to the branch or downstream circuit breaker, wherein the branch or downstream circuit breaker feeds the current to either end loads or to further smaller branch circuit breakers, wherein when the fault occurs only a closest circuit breaker of the one or more circuit breakers upstream of the fault will trip thereby enabling a load to continue to be provided to other circuit breakers of the one or more circuit breakers of the circuit breaker network.

In an embodiment, the fault clearance duration corresponds to a certain time period required for the circuit breaker to clear the fault.

BRIEF DESCRIPTION OF THE DRAWINGS

The present disclosure will be described in even greater detail below based on the exemplary figures. The disclosure is not limited to the exemplary embodiments. All features described and/or illustrated herein can be used alone or combined in different combinations in embodiments of the disclosure. The features and advantages of various embodiments of the present disclosure will become apparent by reading the following detailed description with reference to the attached drawings which illustrate the following:

FIG. 6 illustrates a flow diagram for fault current limiting features of the present disclosure.

DETAILED DESCRIPTION

Figure 1:
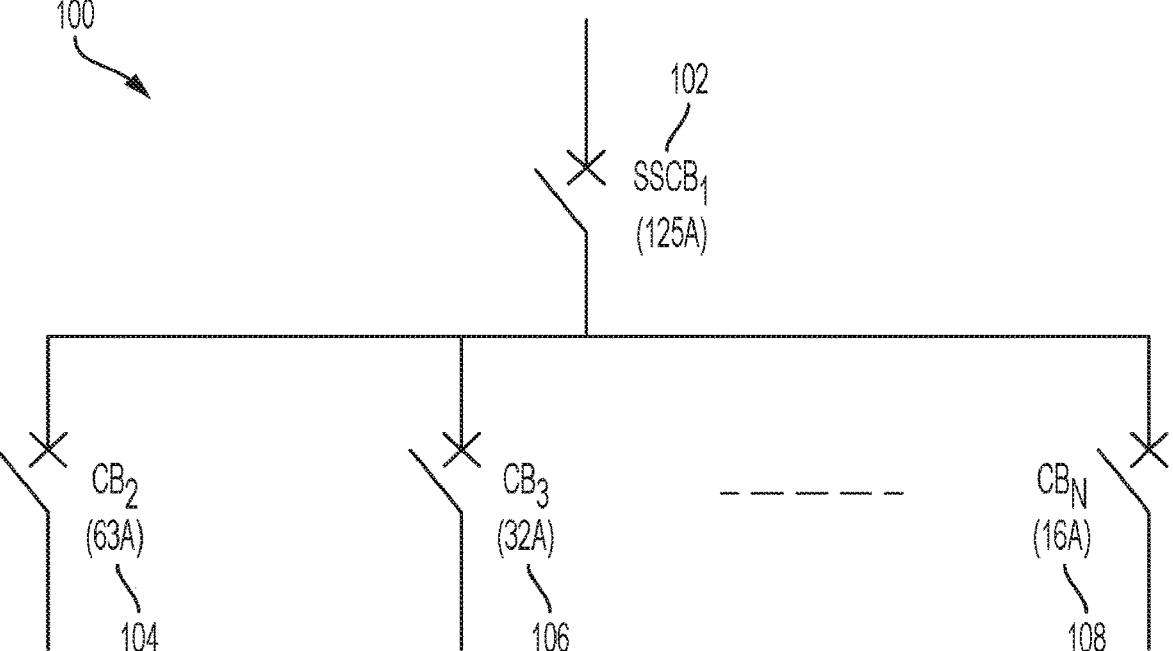
FIG. 1 illustrates an example schematic of a conventional radial DC power system with an upstream SSCB and downstream circuit breakers.

Embodiments of the present disclosure provide for fault current limiting between solid-state circuit breakers and other breakers of a circuit breaker network. While the present disclosure is described primarily in connection with SSCBs and circuit breakers in DC power systems, as would be recognized by a person of ordinary skill in the art, the disclosure is not so limited and inventive features apply to other circuit breaker types (e.g., an upstream SSCB and other downstream SSCBs), alternative configurations other than radial DC power systems, and alternating current (AC) sources.

According to aspects of the present disclosure, novel band-to-band implementation of fault current limiting using SSCBs is described which provides solutions to problems associated with conventional circuit breakers and power systems. For example, the novel system described herein utilizes an upstream SSCB with a current limiting control circuit that will limit the fault current level between two bands. While limiting the fault current level between the two bands there is still sufficient fault current to trip a downstream circuit breaker, presumably closest to the fault location in the network, but not enough fault current to trip the upstream SSCB. By utilizing such a fault current limiting feature, the present disclosure solves high fault current problems present in DC power networks. For example, fault current in a DC network depends highly on the location of the fault in the network. The peak of a fault current depends on the DC resistance between the voltage source and the fault location, and the fault's rate of rise (di/dt) depends on the fault inductance between the source and the fault location. This results in a system that must be adaptable as each fault event on the DC network can have completely different characteristics, as opposed to fault on AC networks which have more stable characteristics during a fault.

The band-to-band fault current limiting described herein may include a DC power system network that has one upstream SSCB and one or more downstream circuit breakers. These circuit breakers may be other SSCBs or electromechanical circuit breakers. In such a configuration the overcurrent trip current threshold of the downstream circuit breaker is less than the overcurrent trip current threshold of the upstream SSCB. The upstream SSCB can perform fault current limiting through band-to-band current limiting control that calculates an on-time and an off-time for semiconductor switches used in the upstream SSCB as a function of fault inductance and DC bus voltage. This can be highly precise and with extremely low delays to avoid tripping circuit breakers for the entire network. In embodiments, the upstream SSCB can maintain the volt-second balance across small fault inductance values so that an average fault current does not exceed the trip current threshold for a current limiting time interval (fault clearance duration). In an embodiment, the upstream SSCB may be thermally capable of withstanding the energy being dissipated in it over or above the current limiting time interval. The description below with reference to FIGS. 1 and 2 describe conventional network circuits and problems associated with networks that use conventional fault current limiting methods, or do not have fault current limiting methods implemented that are solved by the band-to-band fault current limiting described herein.

FIG. 1 illustrates an example schematic of a conventional radial DC power system 100 with an upstream SSCB 102 and downstream circuit breakers 104-108. As depicted in FIG. 1, each circuit breaker is associated with a current rating (voltage current rating) (e.g., 125 amperes, 63 amperes, etc.). As described above, short circuit currents, from faults occurring, in DC systems may behave differently as compared to short circuit events in AC systems. For example, steady-state short circuit current is limited only by a resistance between the voltage source and the fault location in DC systems. As this resistance can be very small, the prospective short circuit current can be extremely high, ranging up to 100 kilo amps. Further, the rate of rise of this short circuit current (e.g., fault di/dt) is only limited by the fault inductance between the voltage source and the fault location in the DC system. The fault di/dt can range up to several hundred A/μs depending on the location of the fault within the DC system. This high fault di/dt can create issues in conventional fault interruption methods as any delay in a fault interrupting device like a circuit breaker (e.g., $CB_2$ 104) can lead to the prospective fault current rising to unmanageable levels quickly.

Conventional electromechanical breakers may typically operate over a timescale of tens of milliseconds. For example, if a given fault di/dt is 100 A/μs, even with a one millisecond delay, the peak fault current can reach 100 kilo amps at the end of that millisecond. As such, conventional electromechanical circuit breakers are not suitable for dealing with fault currents in DC networks. SSCBs have operating times in the order of a few microseconds, and they can safely interrupt high di/dt faults in a short time period. As depicted in FIG. 1, a conventional radial DC power system 100 may include an upstream SSCB 102 ($SSCB_1$) feeding a DC bus from a voltage source, and several downstream feeds of lower current ratings being protected by circuit breakers (104-108). The circuit breakers 104-108 may be mechanical circuit breakers, electromechanical circuit breakers, or other SSCBs. The system 100 depicted in FIG. 1 may be capable of ensuring that a short circuit current in the network will be interrupted by the circuit breakers 104-108 before it becomes too large and damages the network. However, this type of configuration absent the features described herein can result in more than one circuit breaker interrupting the same fault current (as depicted in FIG. 1 represented by the "X" near each circuit breaker 104-108 and SSCB 102).

For example, if a fault occurs downstream of $CB_2$ 104 then both $CB_2$ 104 and $SSCB_1$ 102 interrupt the fault. As depicted in FIG. 1 this can be problematic for the network as the entire bus being fed through the upstream $SSCB_1$ 102 loses power leading to a much larger power failure on the radial DC power system 100 than in the situation where only $CB_2$ 104 would have tripped. This kind of failure is commonly referred to as "protection coordination failure." Protection coordination failure can occur due to operating time delays in circuit breakers. For example, with reference to FIG. 2, let $d_1$ be the operating time for $SSCB_1$ 102 and $d_2$ be the operating time for $CB_2$ 104 in FIGS. 1 and 2. Let $I_{th1}$ 200 be the trip current threshold set inside $SSCB_1$ 102 and $I_{th2}$ 202 be the trip current threshold set inside $CB_2$ 104. If the fault di/dt is y A/μs, then the peak fault current $I_{peak}$ 204 at which $CB_2$ 104 interrupts the fault current can be written as $$I_{peak} = I_{th2} + y \times d_2. \tag{1}$$

Figure 2:
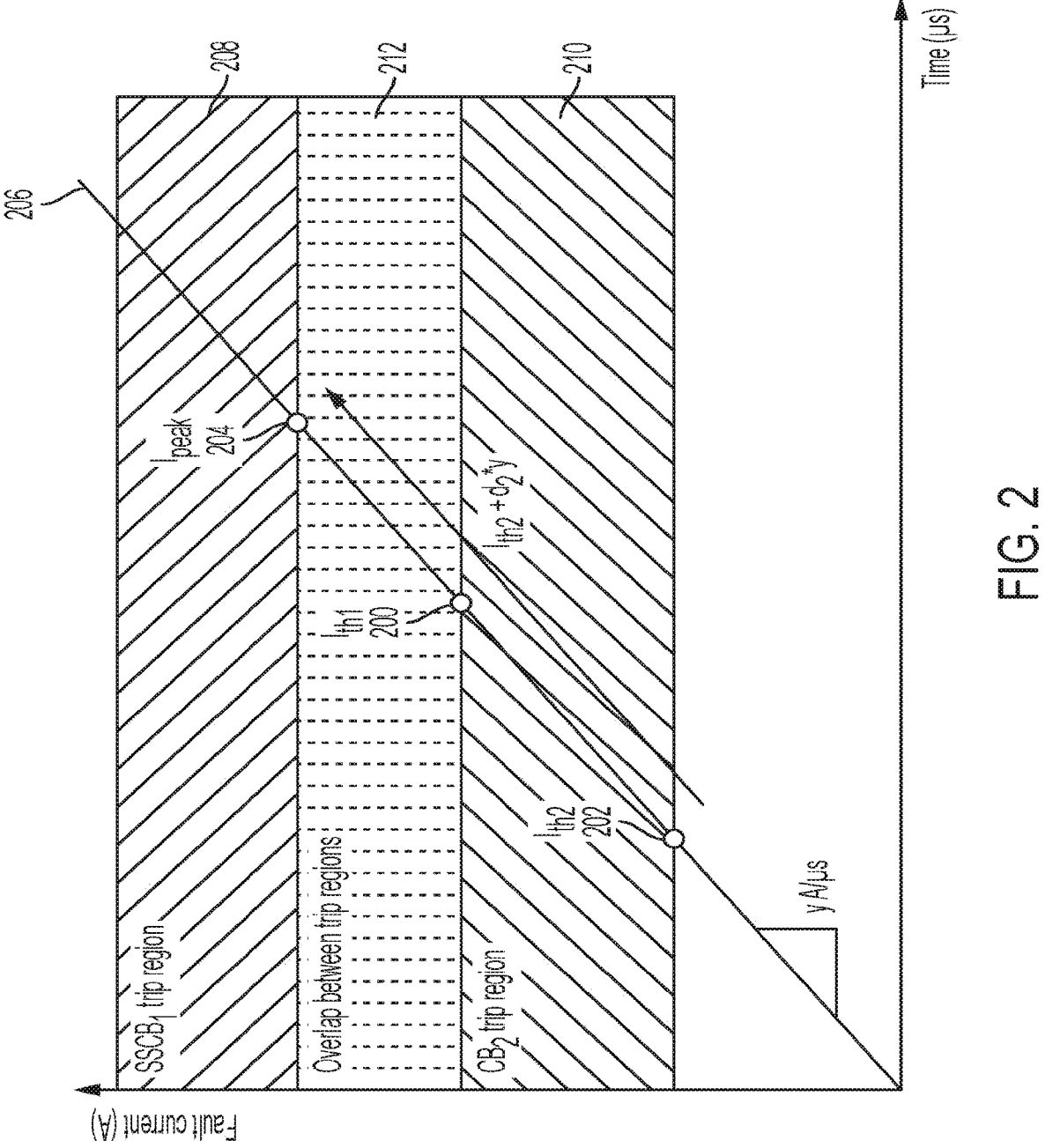
FIG. 2 illustrates an example graph depicting coordination failure at a large rate of rise for a fault current in a system without a compensation circuit.

If, for example, $I_{peak}$ 204 exceeds $I_{th1}$ 200, then $SSCB_1$ 102 will also assume that there is fault-like situation at its terminals, and it will trip $d_1$ microseconds after the fault current exceeds $I_{th1}$ 200. The above described scenario shows how a fault on the output of $CB_2$ 104 can also cause $SSCB_1$ 102 to trip, and it is illustrated in FIG. 2 and represented by $$I_{th1} < I_{peak}. \tag{2}$$

Combining (1) and (2), it can be represented as:

$$y \geq \frac{(I_{th1} - I_{th2})}{d_2}. \tag{3}$$

Equation (3) shows the fault di/dt above which the protection coordination between $SSCB_1$ 102 and $CB_2$ 104 will fail. The fault di/dt is inversely proportional to the operational delay $d_2$, i.e., the minimum fault di/dt at which the protection coordination will fail will reduce as the operational delay in the downstream circuit breaker increases. EMCBs and mechanical circuit breakers serving as downstream circuit breakers will coordinate poorly with an upstream SSCB as their combination will fail protection coordination even at relatively low fault di/dt levels. In the situations where downstream circuit breakers like $CB_2$ 104 would have been SSCBs, the delay $d_2$ would be much smaller in the order of a few microseconds. However, as the delay is non-zero, there can always be a fault di/dt at which the protection coordination between even an upstream SSCB and downstream SSCBs will fail absent the novel features described herein. FIG. 2 further depicts the fault current 206, the $SSCB_1$ 102 trip region 208, the $CB_2$ 104 210 trip region, and the overlap between trip regions 212. The overlap in tripping regions 212 can occur even in situations when some sort of compensation techniques are employed to adjust the upstream SSCB ($SSCB_1$ 102) fault current trip current threshold as a function of fault di/dt. In this scenario, the fault current is sufficient to trip the downstream breaker $CB_2$ 104, and the upstream $SSCB_1$'s 102 trip current threshold is being compensated for fault di/dt. Typically, the compensation technique reduces the effective trip current threshold, $I_{th1(c)}$ which can be represented as:

$$I_{th1(c)} = I_{th1} - k \times y. \tag{4}$$

The coefficient k in (4) is adjusted so that $SSCB_1$ 102 may still trip at a peak fault current of $I_{th1}$ over the operational range of the compensation circuit. The effective trip current threshold for $SSCB_1$ 102 may keep reducing as the fault di/dt increases. If $I_{th1(c)} < I_{th2}$, then both $CB_2$ 104 and $SSCB_1$ 102 will still trip for the same fault. The maximum fault di/dt $y_{max}$ at which coordination between the two can still be successful is represented as:

$$y_{max} < \frac{(I_{th1} - I_{th2})}{k}. \qquad (5)$$

However, predicting fault di/dt levels still result in protection coordination failure as represented by (3) and (5). The fault current limiting features described herein can solve the problems associated with conventional fault current limiting techniques and can work in scenarios where both the upstream and downstream circuit breakers are SSCBs. A problem of faults in DC systems is that the rate of rise of a fault current is dependent on the fault inductance. Cable inductance forms a major part of this fault inductance, so the distance of the fault from the source can affect the fault di/dt. Since a fault can occur physically anywhere, each fault is unique, and it has its own fault di/dt. Conventional methods of protection coordination that use fault current limiting use pulse-width-modulation (PWM) that require a frequency that is programmed into the control circuit. However, this does not solve the problems described with DC systems as no matter where the fault occurs, the SSCB on-time plus the SSCB off-time is a fixed value under PWM control used in conventional techniques. For example, in a DC network, if a device must maintain the fault current constant, the typical strategy involves keeping the average current constant while the instantaneous current varies in a properly designed band. So the current rise in the SSCB on-state should equal the current fall in the SSCB off-state represented as:

$$\text{(Rate of rise of current)} \times t_{ON} = \text{(Rate of fall of current)} \times t_{OFF}. \qquad (6)$$

In such a scenario, $t_{ON}$ and $t_{OFF}$ are the on and off times of the SSCB under PWM-based fault current limiting control. The rate of rise of current and the rate of fall of current are both variable and are inversely proportional to the fault inductance value, assuming that the DC bus voltage is constant. If the DC bus voltage reduces during a fault, then these di/dt values will change even within a fault event. Under such conditions, a rigid control like PWM with a pre-determined frequency cannot work as $t_{ON}$ and $t_{OFF}$ cannot take any values independent of each other. Further, the PWM frequency set in the control determines the maximum bandwidth of the controller as per Nyquist-Shannon sampling theorem, i.e. half of the PWM frequency. These limitations of the PWM-based fault control limiting controller make it unsuitable for improving coordination between circuit breakers in a network such as two SSCBs in a DC network. The present disclosure solves these problems by using a fault control limiting method that calculates the on-state time ($t_{ON}$) and the off-state time ($t_{OFF}$) for the upstream SSCB in real time and independent of the fault location or variations in the DC bus voltage. An equivalent switching frequency from PWM control for a fault current limiting controller of the present disclosure is always changing and updating depending on the fault location and changes in the DC bus voltage of for the DC system.

Figure 3:
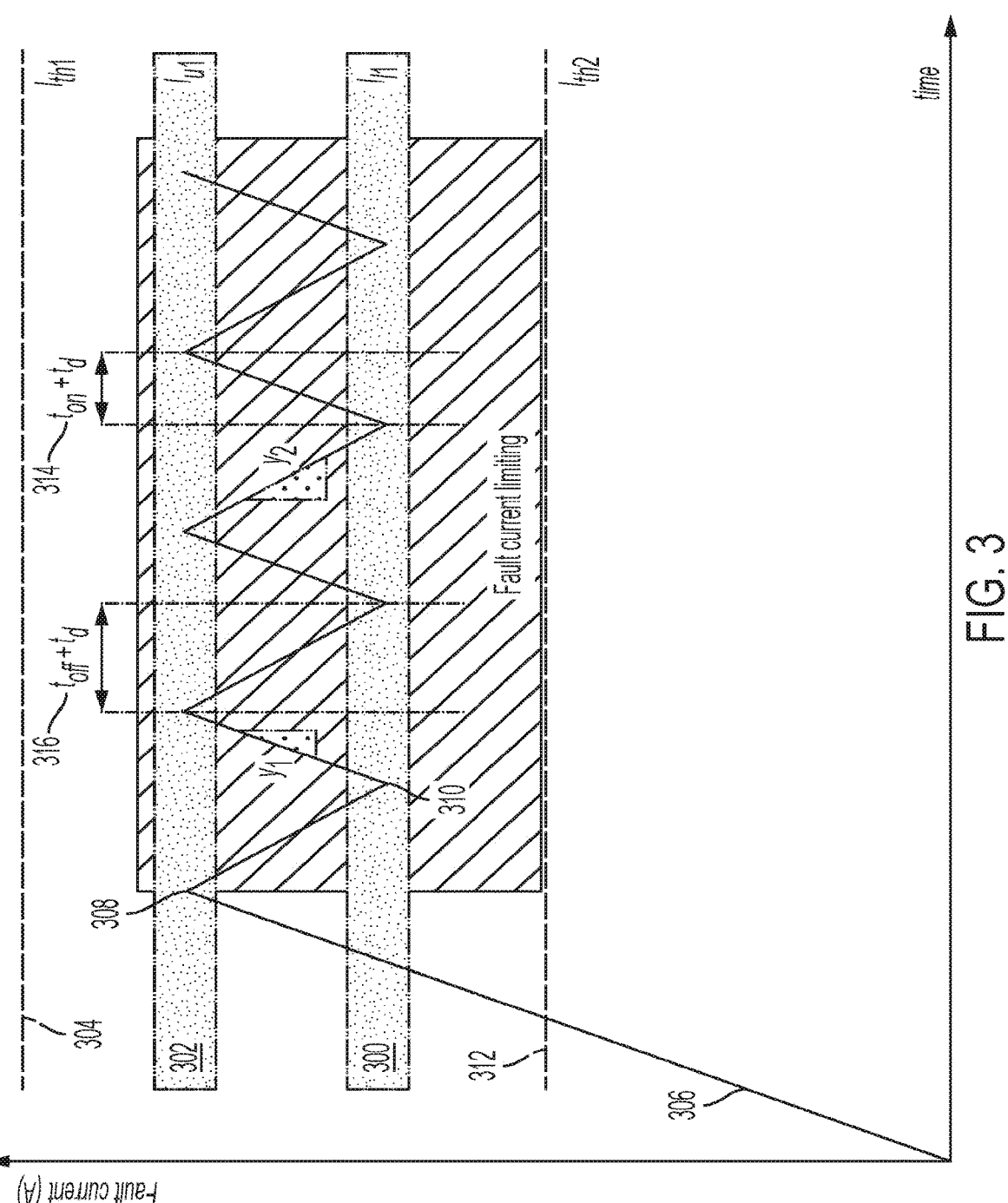
FIG. 3 illustrates an example graph depicting fault current limiting according to embodiments of the present disclosure and showing the volt-second balance for constant average current.

FIG. 3 illustrates an example graph depicting fault current limiting according to embodiments of the present disclosure and showing the volt-second balance for constant average current. As described herein, the peak of a fault current depends on the DC resistance between the voltage source and the fault location, and the fault di/dt depends on the fault inductance between the source and the fault location. As such, each fault event in a DC network can have completely different characteristics as opposed to faults on AC networks. In embodiments, the upstream SSCB may be designed to perform fault current limiting. The SSCB will limit the fault current level between two bands (current thresholds) $I_{l1}$ 300 and $I_{u1}$ 302 such that $I_{u1}$ 302 > $I_{l1}$ 300 and $I_{u1}$ 302 < $I_{th1}$ 304. While doing so, there is sufficient fault current to trip a downstream CB with the highest current rating (e.g., $CB_2$ 104 in FIG. 1), but not enough fault current to trip the upstream $SSCB_1$ 102.

In embodiments, to keep the fault current level within a band, the volt-seconds that are imposed on the fault inductance $L_f$ need to be balanced during every switching cycle. Let $y_1$ be the rising fault di/dt during the short circuit event. If the source voltage $V_{dc}$ does not drop during a fault (due to a large source capacitance), then $y_1$ can be expressed as $$y_1 = \frac{V_{dc}}{L_f}. \qquad (7)$$

As depicted in FIG. 3, the fault current 306 includes peaks 308 and valleys 310 as it is maintained between bands 300 and 302. Let $y_2$ be the falling di/dt during the current turnoff process. Let $V_{cc}$ be the average voltage produced by the clamping circuit of the SSCB during the current turnoff process. By design, $V_{cc} > V_{dc}$ to bring the current down to zero in a normal SSCB. $y_2$ can be expressed as $$y_2 = \frac{(V_{dc} - V_{cc})}{L_f}. \qquad (8)$$

If $t_{on}$ is the time calculated by the SSCB to allow the current to rise in the band 302 from its minimum value, and $t_{off}$ is the time calculated by the SSCB to allow the current to fall in the band 300 from its maximum value, the ideal volt-seconds balance can be written as $$\Delta I = y_1 \times t_{on} = -y_2 \times t_{off}. \qquad (9)$$

However, any circuit that is calculating the switching timing has some inherent delays and the gate driver for the switching device (e.g., the upstream SSCB) also needs a finite amount of time to operate the semiconductor switch. Let $t_d$ be the total delay time in microseconds that is introduced through the control circuit (current limiting control circuit) and the gate driver (gate driver circuit) of the upstream SSCB. Equation (8) can now be written as $$y_1 \times (t_{on} + t_d) = -y_2 \times (t_{off} + t_d). \qquad (10)$$

9

The peak current 308 reached within the band 302 should be less than the trip current threshold of the upstream SSCB, i.e., $I_{th1}$ 304. Thus, $t_{on}$ can be represented as $$t_{on} < L_f \times \frac{I_{th1} - I_{th2}}{V_{dc}} - t_d. \tag{11}$$

The lower bound of the fault current 310 (falling fault current) should be above the trip current threshold of the downstream CB, i.e. $I_{th2}$ 312. Thus, $t_{off}$ can be represented as $$t_{off} < L_f \times \frac{I_{th1} - I_{th2}}{V_{cc} - V_{dc}} - t_d. \tag{12}$$

Both $t_{on}$ and $t_{off}$ are dependent on the fault inductance $L_f$ and since $L_f$ is different for every short circuit event, a PWM-based approach with a constant switching frequency cannot be utilized to perform true fault current limiting. The switching times, $t_{on}$ and $t_{off}$, 314 and 316, respectively, need to be calculated in real-time for each fault event to ensure the proper volt-second balance across $L_f$. Note that $t_{on}$ and $t_{off}$ 314 and 316 depicted in FIG. 3 include the total delay time ta. As depicted in FIG. 3, as the upstream SSCB cyclically switches between an off and on state for a time period corresponding to $t_{on}$ and $t_{off}$ 314 and 316 thereby maintaining an average fault current limiting current between the bands 300 and 302. The upstream SSCB may continue to switch between the on and off state for a duration that corresponds to the downstream circuit breaker to clear the fault current (e.g., trip) or until a time period that corresponds to the energy dissipation components of the clamping circuit are exceeded as described herein. Additionally, both (10) and (11) place constraints on the lowest fault inductance for which the upstream SSCB and downstream circuit breaker can coordinate. The delay $t_d$ can cause the calculated switching times to become negative which is not achievable with any design. Thus, the delays in the control circuit and the gate driver have to be managed so that the range of $L_f$ over which the fault current limiting is operational is large enough to meet system requirements of the circuit breaker network. In embodiments, the delay $t_d$ may be in the order of a few microseconds for fault current limiting circuit configuration and design.

Another aspect of the fault current limiting design of the present disclosure is the thermal dissipation capacity of the clamping circuit. Let $E_{max}$ be the maximum thermal dissipation capacity of the clamping circuit (for example, the voltage clamping circuit 706 shown in FIG. 7). Energy is dissipated in the clamping circuit when the fault current is falling, and this energy dissipated can be calculated as $$E = \int_{t_{off}+t_d} V_{cc}(I_{u1} - y_2 t)dt = \frac{V_{cc}(I_{u1} + I_{l1})}{2} \times L_f \times \frac{I_{u1} - I_{l1}}{V_{cc} - V_{dc}}. \tag{13}$$

Let $t_{CL}$ be the maximum current limiting time required by the DC power system for successful coordination (fault clearance duration). This time interval is determined by the operational delays within the downstream circuit breakers. In scenarios where the downstream circuit breaker is a solid-state circuit breaker, these delays could range between a few microseconds to a hundred microseconds. However, the delays in an electromechanical circuit breaker are much longer. The voltage clamping circuit of the upstream SSCB may be designed based on system requirements and other design decisions such as cost and size of the SSCB with larger metal-oxide varistors (MOVs), capacitors, or resistors in the voltage clamping circuit. The number of turnoff cycles needed for $t_{CL}$ can be represented as $$N = \frac{t_{CL}}{t_{on} + t_{off} + 2t_d} = \frac{t_{CL}}{L_f\left(\frac{1}{V_{dc}} + \frac{1}{V_{cc} - V_{dc}}\right)(I_{u1} - I_{l1})}. \tag{14}$$

The total energy dissipation in the clamping circuit is $E \times N < E_{max}$. Comparing (12) and (13) it can be determined that $L_f$ gets cancelled when multiplying the two equations. This indicates that the energy dissipation is independent of the fault inductance. However, it is dependent on the average clamping voltage, average fault current limiting current and the current limiting duration $t_{CL}$. The clamping circuit 706 of the upstream SSCB 402 may be designed to account for these factors.

Figure 4:
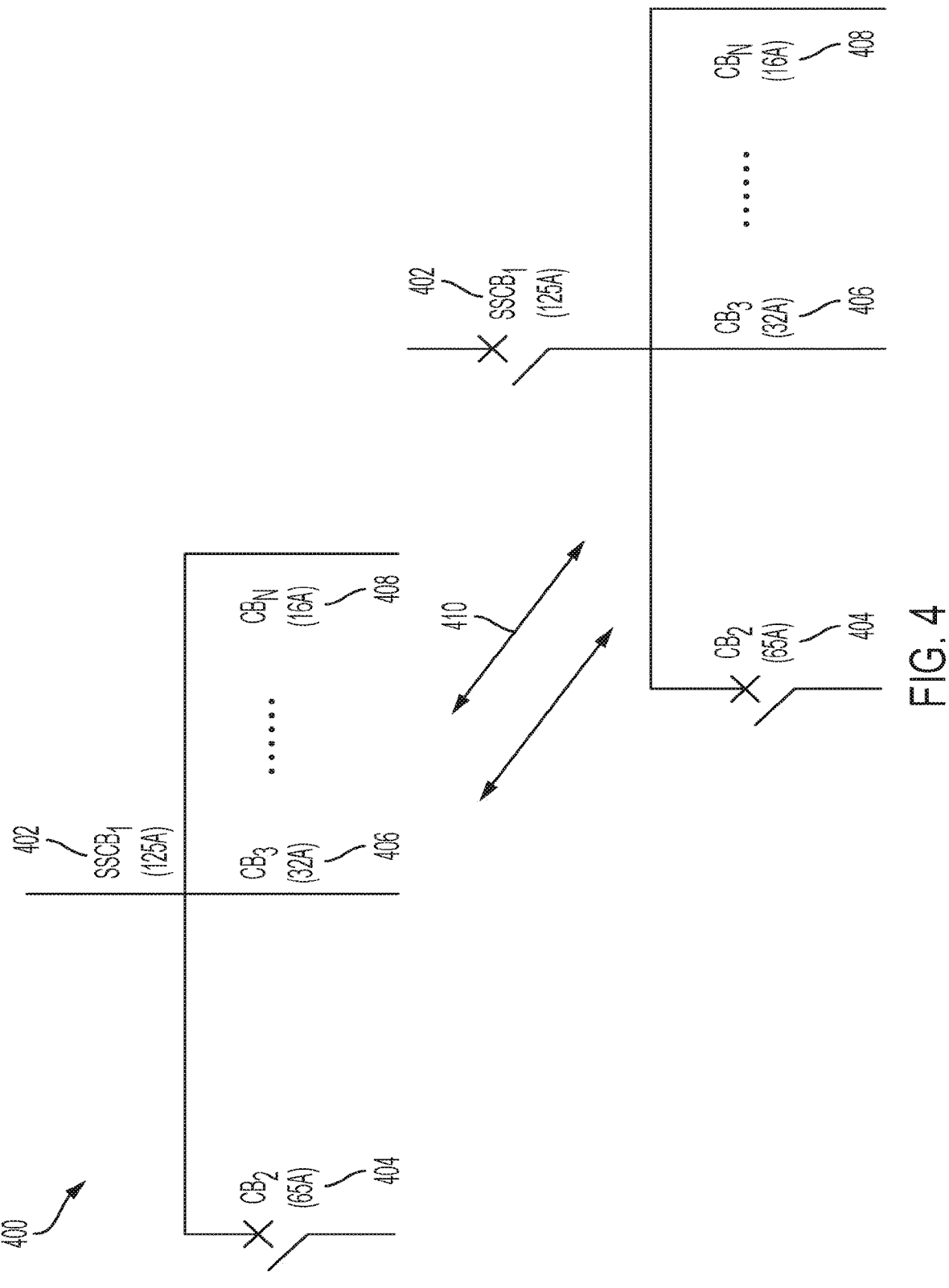
FIG. 4 illustrates an example schematic of a radial DC power system with an upstream SSCB and downstream circuit breakers implementing the fault current limiting features of the present disclosure.

FIG. 4 illustrates an example schematic of a radial DC power system 400 with an upstream SSCB 402 and downstream circuit breakers 404-408 implementing the fault current limiting features of the present disclosure. FIG. 4 depicts the changing of a state 410 of the upstream SSCB 402 from an on state to an off state. As described herein, the upstream SSCB 402 may cyclically switch between the on and off states 410 to control the average fault current between two bands (thresholds) such that the current does not exceed the tripping current threshold for the SSCB 402 and does not fall below the tripping current threshold for the downstream circuit breaker such as circuit breaker 404. As depicted in FIG. 4 and when compared to the conventional radial DC power system 100 of FIG. 1, this results in the radial DC power system 400 not tripping other downstream circuit breakers such as circuit breakers 406 and 408.

Figure 7:
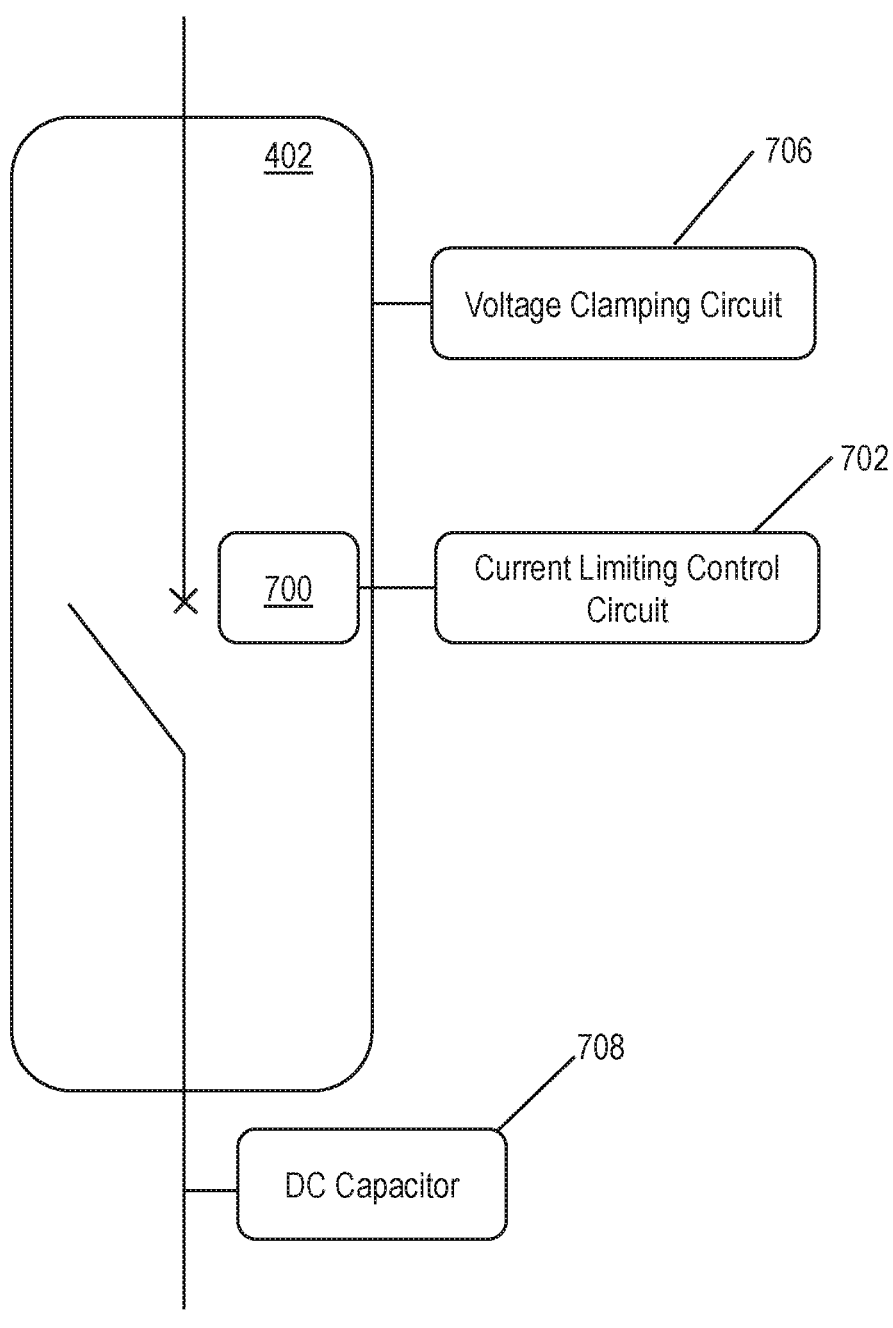
FIG. 7 is a block diagram of the upstream SSCB in accordance with the disclosure.

In embodiments, the upstream SSCB 402 may include a DC capacitor 708 (FIG. 7) or the SSCB 402 may provide output that is directly connected to the DC capacitor which may act as an input stage of a converter. In such embodiments the upstream SSCB 402 may provide fault current limiting to steadily charge the DC capacitor over a long time interval. The di/dt of the DC capacitor 708 current may continually change as the DC capacitor voltage increases. The band-to-band fault current limiting features described herein and implemented by the upstream SSCB 402, via a current limiting control circuit 702 (FIG. 7), may automatically adjust the turn-on and turn-off time intervals of the SSCB's 402 semiconductor switches 700. The switching may keep the average fault current limiting current under the upstream SSCB's 402 overcurrent trip current threshold. This is required as initially the di/dt may be very high as the voltage difference between the source and the DC capacitor voltage may be very high. This difference in voltage may appear as a fault and as such the system can still perform fault current limiting to charge the DC capacitor 708. As the DC capacitor 708 charges the voltage difference reduces the di/dt over time. In embodiments, the current limiting control circuit 702 may be a component of a SSCB 402, as shown in FIG. 7) and include a processor, memory, and computer-readable logic code stored in the memory which is executed by the processor in the known fashion, to determine the $t_{on}$ and $t_{off}$, activate a gate driver for opening and closing a switch of the SSCB (e.g., switching from an on state to an off state and back to an on state), or charging a DC capacitor.

The SSCB may include processing circuitry to execute these functions which can include an application-specific integrated circuits (ASIC) or field programmable gate arrays (FPGAs).

Figure 5:
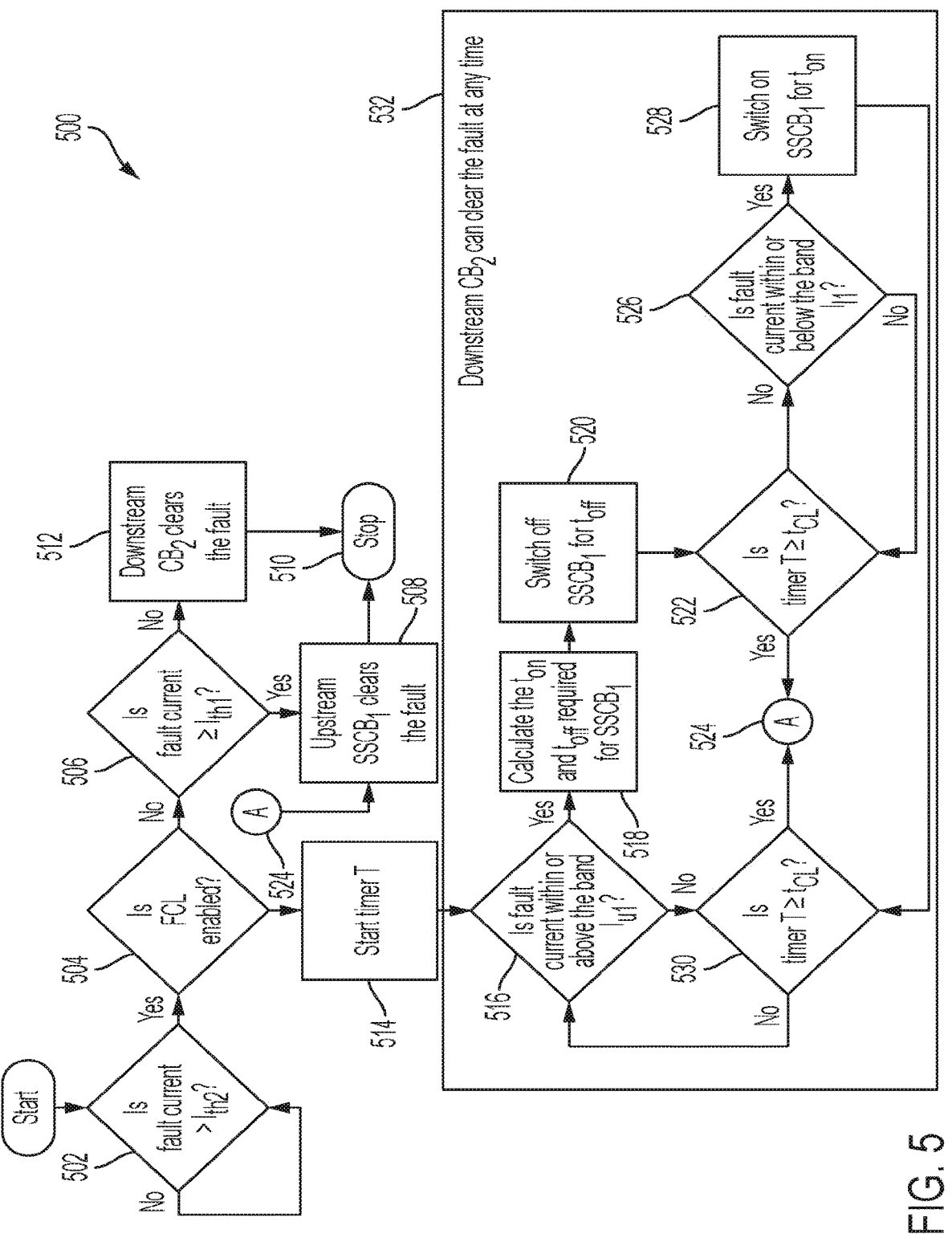
FIG. 5 illustrates a flow chart for fault control limiting in an exemplary embodiment that includes an upstream SSCB and one or more downstream circuit breakers.

FIG. 5 illustrates a flow chart for fault control limiting in an exemplary embodiment that includes an upstream SSCB and one or more downstream circuit breakers. The process 500 of FIG. 5 may be an example process for controlling fault current limiting using an upstream SSCB and one or more downstream circuit breakers in embodiments described herein. FIG. 5 includes an exemplary process 500 which may be performed by an environment or architecture such as in FIG. 3 and by components of FIG. 3. The process 500 includes at Step 502 determining whether a fault current has exceeded the current threshold $I_{th2}$ (e.g., the tripping current threshold for the downstream circuit breaker). If not, the SSCB continues to monitor whether the fault has exceeded the $I_{th2}$ current threshold for the downstream circuit breaker. If the $I_{th2}$ current threshold has been exceeded the process continues at Step 504 by identifying whether fault current limiting has been enabled. In embodiments, a user may specify whether the SSCB should engage in fault current limiting as described herein. Users may wish to bypass the fault current limiting features of an SSCB implementing the features described herein in an abundance of caution or to preserve the lifetime of components in the voltage clamping branch of the SSCB.

If fault current limiting is not enabled at Step 504 the process proceeds to Step 506 by determining whether the fault current exceeds $I_{th1}$ (the tripping current threshold of the upstream SSCB). If the fault current exceeds $I_{th1}$. The process continues to Step 508 with the upstream SSCB clearing the fault by opening the switch and/or using the voltage clamping circuit of the SSCB. The process 500 stops in this scenario at Step 510. At Step 506 if the fault current does not exceed $I_{th1}$ then the process continues to Step 512 with the downstream circuit breaker clearing the fault by tripping and changing to an off state. The process 500 again stops at 510 in this scenario. The process 500 includes starting a timer at Step 514 when it is determined that fault current limiting is enabled at Step 504. The timer depicted in FIG. 5 may be a timer that is compared to the fault clearance duration. In embodiments, the fault clearance duration can be based on the capabilities of the voltage clamping circuit of the SSCB such as an MOV of the SSCB, the thermal dissipation capability of the voltage clamping circuit, or the energy dissipation capability of the SSCB in general (e.g., current dissipation rate). Users may specify a different timer that is less than a pre-defined or pre-determined timer for the SSCB. The fault clearance duration may also refer to a time period required for the downstream circuit breaker to trip and transition to an off state.

The process 500 includes at Step 516 determining whether the fault current is within or above the band $I_{u1}$ (the upper current threshold or peak fault current band). The process 500 includes at Step 518 determining or calculating the $t_{on}$ and $t_{off}$ for performing fault current limiting by the upstream SSCB. Once calculated, the process 500 continues at Step 520 by switching the SSCB to an off state for a duration that corresponds to $t_{off}$. As described herein this will cause the fault current to fall with reference to FIG. 3. The process 500 includes at Step 522 determining whether the timer has exceeded the fault clearance duration $t_{CL}$. The process 500 proceeds to point A 524 which results in the upstream SSCB clearing the fault according to steps 508 and 510. In scenarios where the timer has not exceeded the $t_{CL}$ the process 500 includes Step 526 which determines if the fault current is within or below band $I_{l1}$ (the lower current threshold or falling point/valley of the fault current band). If the fault current is not within or below band $I_{l1}$ then the process 500 again checks to see if the timer has exceeded the $t_{CL}$ (522).

The process 500 includes Step 528 which switches the SSCB to an on state for a duration that corresponds to $t_{on}$. It should be noted that although FIG. 5 depicts switching the SSCB to an on state and off state for a duration that corresponds to $t_{ON}$ and $t_{OFF}$, the durations are modified by the determined delay required for the SSCB to switch via the gate driver. The process 500 includes Step 530 which may be reached upon determining that the fault current is not within or above band $I_{u1}$ or upon switching the SSCB to the on state for $t_{on}$ (e.g., 516 and 528, respectively). At Step 530 if the timer has exceeded the $t_{CL}$ the process 500 proceeds to Step 524, 508, and 510 (e.g., the SSCB clearing the fault). At Step 516 if the fault current is not within or above band $I_{u1}$ the process 500 loops between Steps 516 and 530. As depicted in FIG. 5, the process 500 includes an overall step 532 which indicates that once the timer has started at 514 the downstream circuit breaker may clear the fault by successfully switching the downstream circuit breaker to an off state.

FIG. 6 illustrates a flow diagram 600 for fault current limiting features of the present disclosure. The flow diagram 600 of FIG. 6 may be an example flow chart for controlling fault current limiting using an upstream SSCB and one or more downstream circuit breakers in embodiments described herein. FIG. 6 includes an exemplary flow chart 600 which may be performed by an environment or architecture such as in FIG. 3 and by components of FIG. 3. In embodiments, the fault current limiting features include determining a rate of rise for a fault current of a fault occurring in the circuit breaker network. In embodiments, a circuit breaker network for executing fault control limiting may include a SSCB disposed as a main or upstream breaker. The SSCB may include a current limiting control circuit and a voltage clamping circuit. The circuit breaker network may include one or more circuit breakers disposed as branch or downstream breakers. In embodiments, the SSCB may include a sensor for detecting a fault occurring in the circuit breaker network. The rate of rise for the fault current may be based on the fault inductance between the source and the fault location within the circuit breaker network.

The flow diagram 600 includes at 602 determining a first time period for keeping the SSCB in an on state based at least in part on a delay time period for changing a state of the SSCB to the on state and a first current threshold associated with a tripping current threshold for the SSCB. The flow diagram 600 includes at 604 determine a second time period for keeping the SSCB in an off state based at least in part on a delay time period for changing the state of the SSCB to the off state, a second current threshold associated with a tripping current threshold for a circuit breaker of the one or more circuit breakers, and parameters of the voltage clamping circuit. In embodiments, the delay time period for changing a state of the SSCB to the on state may correspond to the $t_d$, the first time period may correspond to $t_{on}$, and the second time period may correspond to $t_{OFF}$. In embodiments, the delay time period for changing a state of the SSCB to an off state and an on state may be based on at least a speed of opening and closing an associated gate driver circuit of the SSCB, a current sensor, any filters, or other analog components of the network or the SSCB. The flow diagram 600 includes at 606 switching, cyclically, the SSCB to the off state for the second time period and then to the on state for the first time period to control the fault current within a predetermined band-to-band range that is below the first current threshold and above the second current threshold for a fault clearance duration. In embodiments, this can include maintaining or limiting the fault current level between two bands (current thresholds) $I_{l1}$ 300 and $I_{u1}$ 302 such that $I_{u1}$ 302$>I_{l1}$ 300 and $I_{u1}$ 302$<I_{th1}$ 304. While doing so, there is sufficient fault current to trip a downstream CB with the highest current rating (e.g., $CB_2$ 104 in FIG. 1), but not enough fault current to trip the upstream $SSCB_1$ 102, with reference to FIGS. 1-3 described herein.

While the disclosure has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present disclosure covers further embodiments with any combination of features from different embodiments described above and below. Additionally, statements made herein characterizing the disclosure refer to an embodiment of the disclosure and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A circuit breaker network for executing fault current limiting control, comprising:
   a solid-state circuit breaker (SSCB) disposed as a main or upstream circuit breaker, the SSCB comprising a current limiting control circuit, a semiconductor switch, and a voltage clamping circuit; and
   one or more circuit breakers disposed as branch or downstream circuit breakers, wherein the current limiting control circuit comprises a processor, a memory, and computer-readable logic code stored in the memory, that when executed by the processor, causes the current limiting control circuit to:
      determine a first time period for keeping the SSCB in an on state based at least in part on a delay time period for changing a state of the SSCB to the on state and a first current threshold associated with a tripping current threshold for the SSCB;
      determine a second time period for keeping the SSCB in an off state based at least in part on a delay time period for changing the state of the SSCB to the off state, a second current threshold associated with a tripping current threshold for a circuit breaker of the one or more circuit breakers, and parameters of the voltage clamping circuit; and
      switch, cyclically, the SSCB to the off state for the second time period and then to the on state for the first time period to control a fault current within a predetermined band-to-band range that is below the first current threshold and above the second current threshold for a fault clearance duration.

2. The circuit breaker network according to claim 1, wherein the circuit breaker is another SSCB or an electromechanical circuit breaker.

3. The circuit breaker network according to claim 1, wherein the SSCB further comprises a gate driver circuit configured to switch the SSCB between the on state and the off state.

4. The circuit breaker network according to claim 3, wherein the delay time period for changing a state of the SSCB to the on state and the delay time period for changing the state of the SSCB to the off state are based at least in part on a speed of opening and closing associated with the gate driver circuit.

5. The circuit breaker network according to claim 1, wherein the SSCB is arranged in a hierarchical manner such that the main or upstream circuit breaker feeds current to the branch or downstream circuit breaker, wherein the branch or downstream circuit breaker feeds the current to either end loads or to further smaller branch circuit breakers, wherein when a fault occurs only a closest circuit breaker of the one or more circuit breakers upstream of the fault will trip thereby enabling a load to continue to be provided to other circuit breakers of the one or more circuit breakers of the circuit breaker network.

6. The circuit breaker network according to claim 1, wherein the fault clearance duration corresponds to a certain time period required for the circuit breaker to clear a fault associated with the fault current.

7. The circuit breaker network according to claim 6, wherein the current limiting control circuit is further configured to switch the SSCB to the off state upon expiration of the fault clearance duration.

8. The circuit breaker network according to claim 6, wherein the current limiting control circuit is further configured to switch the SSCB to the on state in response to the circuit breaker clearing the fault.

9. The circuit breaker network according to claim 1, further comprising identifying that a fault is occurring in the circuit breaker network based at least in part on comparing the fault current to the second threshold.

10. The circuit breaker network according to claim 1, wherein determining the first time period, the second time period, and switching the SSCB is based on a user preference setting indicating the fault current limiting control for the SSCB.

11. The circuit breaker network according to claim 1, wherein a rate of rise for the fault current of a fault occurring in the circuit breaker network is based on a fault inductance between a source for the circuit breaker network and a fault location of the fault in the circuit breaker network.

12. The circuit breaker network according to claim 1, wherein switching the SSCB to the on state for the first time period allows the fault current for a fault to peak at a certain current value that falls in a first band.

13. The circuit breaker network according to claim 12, wherein switching the SSCB to the off state for the second time period allows the fault current for the fault to fall to another current value that falls in a second band.

14. The circuit breaker network according to claim 13, wherein the first band is less than the tripping current threshold for the SSCB, and wherein the second band is greater than the tripping current threshold for the circuit breaker.

15. The circuit breaker network according to claim 1, further comprising a direct current (DC) capacitor as a downstream load, and wherein the current limiting control circuit is further configured to switch, cyclically, the SSCB between the off state and the on state to charge the DC capacitor.

16. The circuit breaker distribution system according to claim 15, wherein a rate of rise of the current for charging the DC capacitor changes as the DC capacitor voltage increases.

17. A method of providing fault current limiting control in a circuit breaker network, the method comprising:

providing a solid-state circuit breaker (SSCB) disposed as main or upstream circuit breaker, the SSCB comprising a current limiting control circuit, a semiconductor switch, and a voltage clamping circuit; and a circuit breaker disposed as a branch of downstream breaker, wherein the current limiting control circuit is configured to:

determine a rate of rise for a fault current of a fault occurring in the circuit breaker network;

determine a first time period for keeping the SSCB in an on state based at least in part on the rate of rise for the fault current, a delay time period for changing a state of the SSCB to the on state, and a first current threshold associated with a tripping current threshold for the SSCB;

determine a second time period for keeping the SSCB in an off state based at least in part on a rate of fall for the fault current, a delay time period for changing the state of the SSCB to the off state, a second current threshold associated with a tripping current threshold for the circuit breaker, and parameters of the voltage clamping circuit; and switch, cyclically, the SSCB to the off state for the second time period and then to the on state for the first time period to control the fault current within a predetermined band-to-band range that is below the first current threshold and above the second current threshold for a fault clearance duration.

18. A current limiting control circuit of a solid-state circuit breaker (SSCB) for providing fault current limiting control in a circuit breaker network, the current limiting control circuit comprising processing circuitry configured to:

determine a rate of rise for a fault current of a fault occurring in the circuit breaker network;

determine a first time period for keeping the SSCB in an on state based at least in part on the rate of rise for the fault current, a delay time period for changing a state of the SSCB to the on state, and a first current threshold associated with a tripping current threshold for the SSCB;

determine a second time period for keeping the SSCB in an off state based at least in part on a rate of fall for the fault current, a delay time period for changing the state of the SSCB to the off state, and a second current threshold associated with a tripping current threshold for a circuit breaker of the circuit breaker network; and switch, cyclically, the SSCB to the off state for the second time period and then to the on state for the first time period to control the fault current within a predetermined band-to-band range that is below the first current threshold and above the second current threshold for a fault clearance duration.

19. The current limiting control circuit according to claim 18, wherein the SSCB is disposed as a main or upstream circuit breaker, the circuit breaker is disposed as a branch or downstream circuit breaker, and wherein the SSCB is arranged in a hierarchical manner such that the main or upstream circuit breaker feeds the current to the branch or downstream circuit breaker, wherein the branch or downstream circuit breaker feeds the current to either end loads or to further smaller branch circuit breakers, wherein when the fault occurs only a closest circuit breaker of the one or more circuit breakers upstream of the fault will trip thereby enabling a load to continue to be provided to other circuit breakers of the one or more circuit breakers of the circuit breaker network.

20. The current limiting control circuit according to claim 18, wherein the fault clearance duration corresponds to a certain time period required for the circuit breaker to clear the fault.

* * * * *